(12) United States Patent
Yang (10) Patent No.: US 11,272,411 B2
(45) Date of Patent: *Mar. 8, 2022

(54) METHOD AND APPARATUS FOR DETERMINING STATE OF TERMINAL DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,619

(22) Filed: Sep. 15, 2020

(65) Prior Publication Data

US 2020/0413313 A1 Dec. 31, 2020

Related U.S. Application Data

(60) Division of application No. 16/222,338, filed on Dec. 17, 2018, now Pat. No. 10,813,022, which is a
(Continued)

(51) Int. Cl.
*H04W 36/08* (2009.01)
*H04W 36/24* (2009.01)
(Continued)

(52) U.S. Cl.
CPC ........... *H04W 36/08* (2013.01); *H04W 36/12* (2013.01); *H04W 36/24* (2013.01); *H04W 36/36* (2013.01);
(Continued)

(58) Field of Classification Search
CPC ..... H04W 36/08; H04W 36/12; H04W 36/24; H04W 36/36; H04W 42/02; H04W 76/27;
(Continued)

(56) References Cited

U.S. PATENT DOCUMENTS 5,555,445 A 9/1996 Booth
8,072,986 B2 * 12/2011 Wakabayashi ....... H04B 1/1027
370/395.4
(Continued)

FOREIGN PATENT DOCUMENTS

CN 1984008 A 6/2007
CN 102711216 A 10/2012
(Continued)

OTHER PUBLICATIONS

The first Office Action of corresponding European application No. 16915449.9, dated Mar. 5, 2021.
(Continued)

*Primary Examiner* — Warner Wong
(74) *Attorney, Agent, or Firm* — Ladas & Parry LLP (57) ABSTRACT

Embodiments of the present application provide a method and an apparatus for determining a state of a terminal device. The method includes: the terminal device determines an amount of data to be sent; and the terminal device determines, according to the amount of data to be sent, a state in which the terminal device needs to be. According to the embodiments of the present application, unnecessary state switching can be avoided for the terminal device, signaling overhead can be reduced, and power consumption of the terminal device can be reduced, thereby improving system efficiency.

12 Claims, 2 Drawing Sheets

200

A terminal device determines an amount of data to be sent — S210

The terminal device determines, according to the amount of data to be sent, a state in which the terminal device needs to be — S220

Related U.S. Application Data continuation of application No. PCT/CN2016/098351, filed on Sep. 7, 2016.

(51) Int. Cl.
*H04W 36/12* (2009.01)
*H04W 36/36* (2009.01)
*H04W 76/27* (2018.01)
*H04W 52/02* (2009.01)

(52) U.S. Cl.
CPC ........ *H04W 52/0254* (2013.01); *H04W 76/27* (2018.02); *Y02D 30/70* (2020.08)

(58) Field of Classification Search
CPC ......... H04L 29/08594; H04L 29/08576; H04L 67/14; H04L 67/142; H04L 41/08; H04L 41/0803; H04L 41/0813; H04L 1/0019
See application file for complete search history.

(56) References Cited

U.S. PATENT DOCUMENTS

| | | | |
|---|---|---|---|
| 9,313,812 | B2 | 4/2016 | Bangolae et al. |
| 2008/0261600 | A1 | 10/2008 | Somasundaram et al. |
| 2013/0242909 | A1 | 9/2013 | Kim |
| 2014/0143313 | A1 | 5/2014 | Tanaka et al. |
| 2014/0204845 | A1 | 7/2014 | Khay-Ibbat |
| 2015/0181606 | A1 | 6/2015 | Gribe et al. |
| 2015/0215415 | A1 | 7/2015 | Zhang et al. |
| 2016/0037450 | A1 | 2/2016 | Richards |
| 2016/0351110 | A1* | 12/2016 | Jin .......................... G09G 3/20 |
| 2018/0049091 | A1 | 2/2018 | Wang |

FOREIGN PATENT DOCUMENTS

| | | | |
|---|---|---|---|
| CN | 102870145 | A | 1/2013 |
| CN | 103763748 | A | 4/2014 |
| WO | 2014174243 | A1 | 10/2014 |
| WO | 2014182489 | A2 | 11/2014 |

OTHER PUBLICATIONS

The third Office Action of corresponding Chinese application No. 201880086925., dated Jun. 23, 2021.

The First Office Action of parent U.S. Appl. No. 16/222,338, dated Feb. 27, 2020.
"Discussion on Efficient Small Data Transmission in Inactive State", 3GGPP TSG-RAN 2 Meeting #95 R2-164777, Aug. 26, 2016.
Ericsson et al. "Removing ENs for the Small data fast path solution", 3GPP Draft; S2-132786 FP Updates V4.5,3rd Generation Partnership Project (3GPP), Mobile Competence Centre; 650, Route Des Lucioles; F-06921 Sophia-Antipolis Cedex France, vol. SA WG2, No. Valencia, Spain; Jul. 15, 2013-Jul. 19, 2013, Jul. 17, 2013 (Jul. 17, 2013), XP050726143.
International Search Report(ISR) dated Jun. 6, 2017 for Application No. PCT/CN2016/098351.
The EESR of parallel EP application No. 16915449.9, dated Mar. 28, 2019.
The first OA of the parallel CN application No. 201680086925.X, dated Apr. 29, 2020.
The first OA of the parallel IN application No. 201817048898, dated Jul. 7, 2020.
Espacenet English abstract of CN 103763748 A.
Espacenet English abstract of CN 102870145 A.
Espacenet English abstract of CN 102711216 A.
Espacenet English abstract of CN 1984008 A.
The first Office Action of corresponding Japanese application No. 2019-500393. dated Nov. 27, 2020.
CMCC, Discussion on UE states in NR[online], 3GPP TSG-RAN WG2#95 R2-165211, Aug. 12, 2016. tps ://www.3gpp.org/ftp/tsg_ran/WG2_RL2/TSGR2_95/Docs/R2-165211.zip>.
Nokia Networks: SA WG2 Meeing #S2-113ah S2-161323; Solution: Mobility Framework, published on Feb. 26. 2016.
The first Office Action of corresponding Taiwan application No. 106129612, dated Jan. 29, 2021.
The second Office Action of corresponding Chinese application No. 201680088925.X. dated Dec. 25, 2020.
3GPP TS 23.401 V15.0 0, 3rd Generation Partnership Project Technical Specification Group Services and System Aspects; General Packet Radio Service (GPRS) enhancements for Evolved Universal Terrestrial Radio Access Network (E-UTRAN) access (Release 15), 386 pages, Jun. 2017.
3GPP TS 36.331 V15.0.0, 3rd Generation Partnership Project, Technical Specification Group Radio Access Network Evolved Universal Terrestrial Radio Access (E-UTRA) Radio Resource Control (RRC); Protocol specification (Release 15), 735 pages, Dec. 2017.
The first Office Action of corresponding Indian application No. 202018042505, dated Nov. 12, 2021.

* cited by examiner

METHOD AND APPARATUS FOR DETERMINING STATE OF TERMINAL DEVICE

CROSS-REFERENCE TO RELATED APPLICATION

This application is a divisional application of U.S. patent application Ser. No. 16/222,338, filed on Dec. 17, 2018, which is a continuation of International Application No. PCT/CN2016/098351, filed on Sep. 7, 2016, the disclosures of which are hereby incorporated by reference in their entireties.

TECHNICAL FIELD

The present application relates to the field of communications and, more particularly, to a method and an apparatus for determining a state of a terminal device.

BACKGROUND

In a wireless communication system, a terminal device has two basic operation modes: one is an idle mode, that is, a standby state as commonly referred to; the other is a connection mode, in which there is a radio resource control (Radio Resource Control, "RRC" for short) connection between the terminal device and the evolved universal terrestrial radio access network (Universal Terrestrial Radio Access Network, "UTRAN" for short).

When the operation mode is the idle mode, the terminal device needs to receive or send data, and then it transfers to the connection mode for establishing a high-level signaling connection, and performs data transmission. Therefore, the state what the terminal device is in when the data transmission is performed affects power consumption of the terminal device and system performance. Unnecessary state switching may cause a high signaling overhead and power consumption for the terminal device.

SUMMARY

Embodiments of the present application provide a method and an apparatus for determining a state of a terminal device, which can save signaling overhead and reduce power consumption of the terminal device, thereby improving system efficiency.

In a first aspect, a method for determining a state of a terminal device is provided, including:
determining, by the terminal device, an amount of data to be sent; and
determining, by the terminal device, according to the amount of data to be sent, a state in which the terminal device needs to be.

Specifically, when a terminal device needs to send data to a first access network device, the terminal device may first determine an amount of data to be sent, and then determine, according to the amount of data to be sent, a state in which the terminal device needs to be.

Therefore, in the embodiments of the present application, the terminal device determines, according to the amount of data to be sent, a state in which the terminal device needs to be so that the terminal device performs data transmission in a required state, thus it is possible to avoid an unnecessary switching process, save signaling overhead, and reduce power consumption of the terminal device, thereby improving system efficiency.

Optionally, in a first state, the terminal device and a first access network device remain connected, the terminal device and the first access network device save context information of the terminal device, and when moving within a coverage of all access network devices in an access network device set to which the first access network device belongs, the terminal device performs a cell reselection process without switching between access network devices; in a second state, the terminal device is controlled by an access network device to which the terminal device belongs to switch between access network devices.

It should be understood that, in the first state, since the terminal device does not switch between the access network devices, all the access network devices in the access network device set and a core network device cannot sense a movement of the terminal device, that is, the mobility of the terminal device is unknowable for a network side; in the second state, when the terminal device moves from one cell to another cell, the terminal device is controlled by the access network device to which the terminal device belongs to switch between the access network devices, and the access network device can sense the movement of the terminal device within the coverage of different access network devices.

It should also be understood that the first state and the second state in the embodiments of the present application may be an "inactive state" and an "active state", or may be an idle state, a data connection state, and other states that may occur in a future communication system, which, however, is not limited in the embodiments of the present application.

In a first possible implementation of the first aspect, before the determining, by the terminal device, according to the amount of data to be sent, the state in which the terminal device needs to be, the method further includes: determining, by the terminal device, an uplink transmission resource available in the first state; the determining, by the terminal device, according to the amount of data to be sent, the state in which the terminal device needs to be includes: determining, by the terminal device, according to the amount of data to be sent and the available uplink transmission resource, the state in which the terminal device needs to be.

Specifically, the terminal device may determine the amount of data to be sent and an available uplink transmission resource, and then determine, with a comprehensive consideration of the amount of data to be sent and the available uplink transmission resource, the state in which the terminal device needs to be.

Therefore, for the terminal device in the first state, if the available uplink transmission resource is sufficient to transmit the to-be-sent data, the terminal device may continue to remain in the first state; and for the terminal device in the second state, if the uplink transmission resource available in the first state is insufficient to transmit the to-be-sent data, then the terminal device may remain in the second state, thus it is possible to avoid unnecessary state switching and save signaling overhead for the switching.

In conjunction with the above possible implementations of the first aspect, in a second possible implementation of the first aspect, the determining, by the terminal device, according to the amount of data to be sent and the available uplink transmission resource, the state in which the terminal device needs to be includes: determining, by the terminal device, according to the available uplink transmission resource, an amount of data that can be transmitted at a time; and if the amount of data that can be transmitted at a time is less than the amount of data to be sent, determining, by the terminal device, that the terminal device needs to be in the second state.

Specifically, the terminal device may determine, according to the available uplink transmission resource, an amount of data that can be transmitted by the terminal device at a time, and then compare the amount of data that can be transmitted at a time with the amount of data to be sent. If the amount of data that can be transmitted at a time is less than the amount of data to be sent, it indicates that the available uplink transmission resource cannot carry the to-be-sent data at a time, and then the terminal device may determine that it needs to be in the second state, so that the above to-be-sent data can be sent at a time.

In conjunction with the first aspect or any possible implementation thereof described above, in a third possible implementation of the first aspect, the determining, by the terminal device, according to the amount of data to be sent and the available uplink transmission resource, the state in which the terminal device needs to be includes: determining, by the terminal device, according to the available uplink transmission resource, an amount of data that can be transmitted at a time; determining, by the terminal device, according to the amount of data that can be transmitted at a time, a sending time and/or the number of sending times for the amount of data to be sent; and if the sending time is greater than a first threshold and/or the number of sending times is greater than a second threshold, determining, by the terminal device, that the terminal device needs to be in the second state.

In this way, the terminal device calculates a sending time and/or a number of sending times for transmitting the amount of data to be sent, and determines, according to the sending time and/or the number of sending times, the state in which the terminal device needs to be, therefore, it is possible to avoid the sending time being too long or the number of sending times being too many in the first state in the case that the amount of data to be sent is too large or the transmission resources available are too few, thereby reducing power consumption of the terminal device and meanwhile improving user experience.

Optionally, the method further includes: if the sending time is less than or equal to the first threshold and/or the number of sending times is less than or equal to the second threshold, determining, by the terminal device, that the terminal device needs to be in the first state.

In conjunction with the first aspect or any possible implementation thereof described above, in a fourth implementation of the first aspect, the determining, by the terminal device, according to the available uplink transmission resource, the amount of data that can be transmitted at a time includes: determining, by the terminal device, according to the available uplink transmission resource and at least one of maximum available transmit power, a current transmission path loss, and a highest available modulation and coding level, the amount of data that can be transmitted at a time.

In conjunction with the first aspect or any possible implementation thereof described above, in a fifth implementation of the first aspect, before the determining, by the terminal device, the uplink transmission resource available in the first state, the method further includes: sending, by the terminal device, a resource request message to the first access network device, where the resource request message is used to request the first access network device to allocate an uplink transmission resource to the terminal device; and the determining, by the terminal device, the uplink transmission resource available in the first state includes: determining, by the terminal device, the available uplink transmission resource according to the allocating by the first access network device.

Specifically, in the case that the first access network device does not reserve an uplink transmission resource for the terminal device in the first state, the terminal device may first send a resource request message to the first access network device, requesting the first access network device to allocate the uplink transmission resource to the terminal device, the first access network device allocates the available uplink transmission resource to the terminal device according to the resource request message, and the terminal device may use the available uplink transmission resource to transmit data.

In conjunction with the first aspect or any possible implementation thereof described above, in a sixth implementation of the first aspect, the determining, by the terminal device, according to the amount of data to be sent, the state in which the terminal device needs to be includes: if the amount of data to be sent is greater than a third threshold, determining, by the terminal device, that the terminal device needs to be in the second state.

Specifically, the terminal device may compare the amount of data to be sent with a preset third threshold, and determine that the terminal device needs to be in the second state in the case that the amount of data to be sent is greater than the third threshold, thereby ensuring a completion of data transmission of the amount of data to be sent as described above.

In conjunction with the first aspect or any possible implementation thereof described above, in a seventh implementation of the first aspect, the determining, by the terminal device, that the terminal device needs to be in the second state includes: if the amount of data to be sent at each moment within a first time period is continuously greater than the third threshold, determining, by the terminal device, that the terminal device needs to be in the second state.

In this way, the terminal device counts the amount of data to be sent within a first time period, and determines, from a continuous determination of the amount of data to be sent within the first time period, the state in which the terminal device needs to be, thus it is possible to avoid a situation in which a frequent state switching occurs due to the amount of data to be sent being unstable, and to save signaling overhead.

In conjunction with the first aspect or any possible implementation thereof described above, in an eighth implementation of the first aspect, the determining, by the terminal device, according to the amount of data to be sent, the state in which the terminal device needs to be includes: if the amount of data to be sent is less than a fourth threshold, determining, by the terminal device, that the terminal device needs to be in the first state.

Specifically, the terminal device may determine that the terminal device needs to be in the first state when the amount of data to be sent is less than the fourth threshold. In this way, it is possible to ensure that the terminal device is in the first state when not sending a large amount of data, thereby saving the overhead of related signaling.

Optionally, the fourth threshold may be equal to the third threshold described above.

In conjunction with the first aspect or any possible implementation thereof described above, in a ninth implementation of the first aspect, the determining, by the terminal device, that the terminal device needs to be in the first state includes: if the amount of data to be sent at each moment within a second time period is continuously less than the fourth threshold, determining, by the terminal device, that the terminal device needs to be in the first state.

In this way, the terminal device counts the amount of data to be sent within a second time period, and determines, from a continuous determination of the amount of data to be sent within the second time period, the state in which the terminal device needs to be, thus it is possible to avoid a situation in which a frequent state switching occurs due to the amount of data to be sent being unstable, and to save signaling overhead.

In conjunction with the first aspect or any possible implementation thereof described above, in a tenth implementation of the first aspect, after the determining, by the terminal device, according to the amount of data to be sent, the state in which the terminal device needs to be, the method further includes: if a current state of the terminal device is different from the state in which the terminal device needs to be, determining, by the terminal device, to perform a state switching.

Specifically, the terminal device may be currently in the first state or the second state, if the state in which the terminal device needs to be as determined by the terminal device according to the amount of data to be sent is different from the current state of the terminal device, the terminal device may determine to perform the state switching, that is, switch from the current state to the first state or the second state.

In conjunction with the first aspect or any possible implementation thereof described above, in an eleventh implementation of the first aspect, after the determining, by the terminal device, to perform the state switching, the method further includes: sending, by the terminal device, a switching request message to the first access network device, where the switching request message is used to request the first access network device to perform a configuration of the state switching of the terminal device; receiving, by the terminal device, a configuration complete message sent by the first access network device according to the switching request message, where the configuration complete message is used to indicate that the first access network device completes the configuration of the state switching; and performing, by the terminal device, the state switching according to the configuration complete message.

Specifically, after determining to perform the state switching, the terminal device may send a switching request message to the first access network device, requesting the first access network device to perform a related configuration of the state switching, the first access network device, after completing the configuration of the state switching of the terminal device, sends a configuration complete message to the terminal device; the terminal device receives the configuration complete message sent by the first access network device, and then performs the state switching, that is, switches from the first state to the second state, or switches from the second state to the first state.

Optionally, the switching request message carries an event indicating that the amount of data to be sent is greater than the third threshold or less than the fourth threshold; or the switching request message carries an event indicating that the sending time is greater than the first threshold; or the switching request message carries an event indicating that the number of sending times is greater than the second threshold.

In conjunction with the first aspect or any possible implementation thereof described above, in a twelfth implementation of the first aspect, the data to be sent is: data buffered by the terminal device in at least one of the following layers: a physical layer, a packet data convergence protocol PDCP layer, a radio link control RLC layer, a media access control MAC layer, and an application layer.

It should be understood that the message exchanged between the terminal device and the first access network device may be a radio resource control (Radio Resource Control, "RRC" for short) message, an MAC message, or a physical layer message, which is not limited in the embodiments of the present application either.

In a second aspect, an apparatus for determining a state of a terminal device is provided for performing the method in the first aspect or any possible implementation of the first aspect. Specifically, the apparatus includes a unit for performing the method in the first aspect or any possible implementation of the first aspect.

In a third aspect, an apparatus for determining a state of a terminal device is provided, including: a receiver, a sender, a memory, a processor and a bus system, where the receiver, the sender, the memory and the processor are connected via the bus system, the memory is configured to store instructions, the processor is configured to execute the instructions stored in the memory to control the receiver to receive a signal and to control the sender to send a signal, and when the processor executes the instructions stored in the memory, the execution causes the processor to perform the method in the first aspect or any possible implementation of the first aspect.

In a fourth aspect, a system for determining a state of a terminal device is provided, including the apparatus and the access network device in the second aspect or any possible implementation of the second aspect.

Alternatively, the system includes the apparatus and the access network device in the third aspect or any possible implementation of the third aspect.

In a fifth aspect, a computer readable medium is provided for storing a computer program, where the computer program includes instructions for performing the method in the first aspect or any possible implementation of the first aspect.

BRIEF DESCRIPTION OF THE DRAWINGS

In order to more clearly illustrate the technical solution in the embodiments of the present application, drawings to be used in description of the embodiments or the prior art will be briefly described below. It is obvious that the drawings described below are only some embodiments of the present application. Those skilled in the art can also obtain other drawings based on these drawings without any creative effort.

DESCRIPTION OF EMBODIMENTS

The technical solution in the embodiments of the present application will be clearly and completely described below with reference to the accompanying drawings in the embodiments of the present application. It is obvious that the described embodiments are a part of the embodiments of the present application, rather than all embodiments of the present application. All other embodiments obtained by those skilled in the at based on the embodiments of the present application without any creative effort should fall into the protection scope of the present application.

The technical solution in the embodiments of the present application can be applied to various communication systems, for example, a global system of mobile communication (Global System of Mobile communication, "GSM" for short), a code division multiple access (Code Division Multiple Access "CDMA" for short) system, a wideband code division multiple access (Wideband Code Division Multiple Access, "WCDMA" for short) system, a general packet radio service (General Packet Radio Service, "GPRS" for short), a long term evolution (Long Term Evolution, "LTE" for short) system, an LTE frequency division duplex (Frequency Division Duplex, "FDD" for short) system, an LTE time division duplex (Time Division Duplex, "TDD" for short), a universal mobile telecommunication system (Universal Mobile Telecommunication System, "UMTS" for short) or a worldwide interoperability for microwave access (Worldwide Interoperability for Microwave Access, "WiMAX" for short) communication system. Alternatively, the technical solution in the embodiments of the present application can also be applied to communication systems that may appear in the future.

In the embodiments of the present application, a terminal device may be referred to as user equipment (User Equipment, "UE" for short), a terminal device, a mobile station (Mobile Station, "MS" for short), a mobile terminal (Mobile Terminal), terminal devices in a future 5G network, or the like. The terminal device may communicate with one or more core networks via a radio access network (Radio Access Network, "RAN" for short). For example, the terminal may be a mobile phone (or is referred to as a "cellular" phone), a computer with a mobile terminal, or the like. For example, the terminal may also be portable, pocket, handheld, computer built-in or in-vehicle mobile devices that exchange voice and/or data with a wireless access network.

The access network device in the embodiments of the present application may be used to communicate with the mobile device. The access network device may be a base station (Base Transceiver Station, "BTS" for short) in the global system of mobile communication (Global System of Mobile communication, "GSM" for short) or the code division multiple access (Code Division Multiple Access, "CDMA" for short), or may be a base station (Node B, "NB" for short) in the Wideband Code Division Multiple Access (Wideband Code Division Multiple Access, "WCDMA" for short), or may be an evolved base station (Evolutionary Node B, "eNB" or "eNodeB" for short) in the long term evolution (Long Term Evolution, LTE), or a relay station or an access point. Alternatively, the access network device may be any one of an in-vehicle device, a wearable device, and an access network device in a future 5G network.

The core network device may be a mobility management entity (Mobility Management Entity, "MME" for short), or may be a serving gateway (Serving Gateway, "S-GW" for short) or a packet data network gateway (PDN Gateway, "P-GW" for short), which is not limited in the present application.

In order to facilitate the understanding of the embodiments of the present application, the following elements are introduced before the introduction of the embodiments of the present application.

The idle mode has only one idle (Idle) state. In the Idle state, all the connections for the UE are closed at an access layer. In the UTRAN, a context is not established for the UE in the idle mode. If a particular UE needs to be addressed, only within one cell, can paging messages be sent to all UEs or to multiple UEs listening to the same paging period.

The connection mode has four states: CELL-PCH (a cell paging channel state), URA-PCH (a UTRAN registration area paging channel state), CELL-FACH (a cell forward access channel state), and CELL-DCH (a cell dedicated channel state). The CELL-DCH is a connection mode for a high-level signaling connection, and may also be referred to as an "active state".

Figure 1:
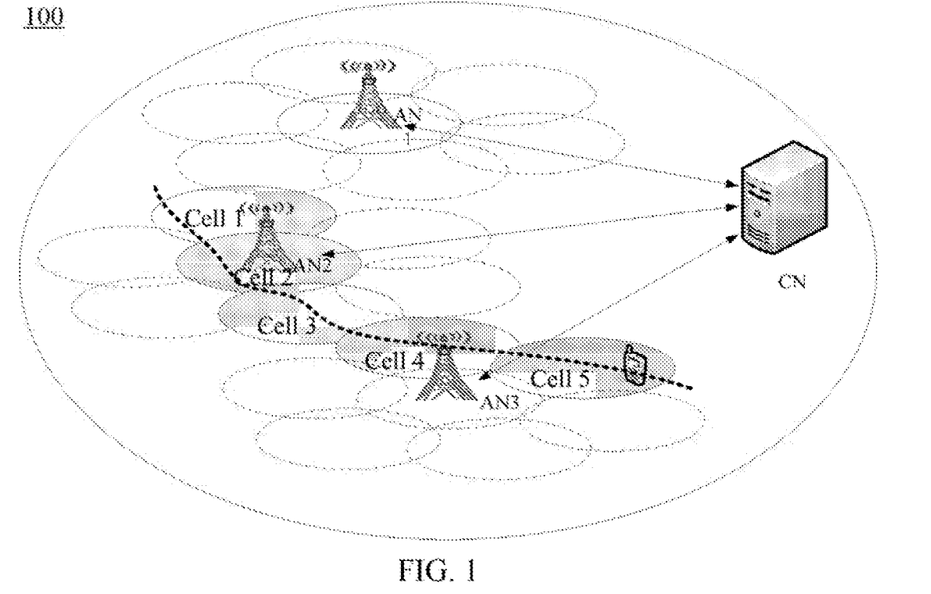
FIG. 1 is a diagram of an application scenario according to an embodiment of the present application.

FIG. 1 is a schematic diagram of an application scenario of the present application. In FIG. 1, when a terminal device resides in a cell 2 of an access network device (Access Network, "AN" for short) 2, and when the terminal device initiates a service connection request, the AN2 establishes a connection with a core network device (Core Network, "CN" for short). The AN2 simultaneously transmits configured context information to the CN, and the CN determines an access network device set according to saved access history information of the terminal device, if it is acquired that an AN3 belongs to the access network device set, the CN establishes a network connection with the AN3, and sends context information of the terminal device to the AN3 who communicates with the network according to the context information. In this way, the terminal device can seamlessly move between the cell covered by the AN3 and the cell covered by the AN2. That is, when the terminal device moves within a range covered by access network devices within the access network device set, there is no need to switch between the access network devices, that is, the network is not notified.

It should be understood that, in the embodiments of the present application, a state where there is no switch between the access network devices for the terminal device within a range covered by all the access network devices in the at least one access network device set may be referred to as an "inactive state". That is, the RRC connection and bearing for the terminal device are reserved within the range covered by all the access network devices in the access network device set, and the core network device is not notified of a behavior of the terminal device at the access layer.

It should also be understood that the name of the inactive state is not limited in the embodiments of the present application. For example, when the access network device set has only one access network device, it may also be referred to as the "idle state".

For a terminal device in the inactive state, when the terminal device needs to perform data transmission, it may switch to the active state, and send data in the active state, or it may use an available uplink transmission resource to perform data transmission in the inactive state. The state of the terminal device in data transmission affects power consumption of the terminal device and system performance. Unnecessary state switching may cause high signaling overhead and power consumption for the terminal device.

Figure 2:
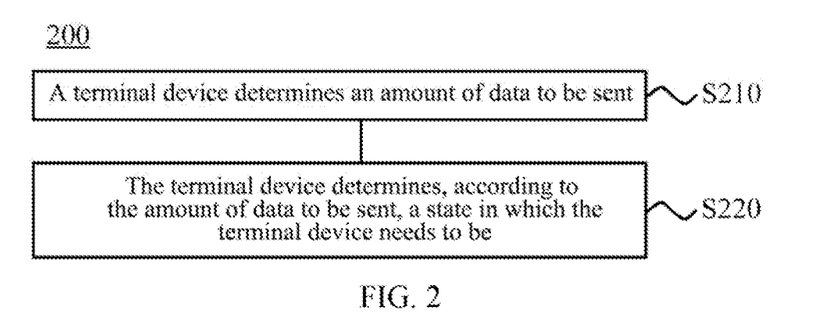
FIG. 2 is a schematic flowchart of a method for determining a state of a terminal device according to an embodiment of the present application.

FIG. 2 shows a schematic flowchart of a method 200 for determining a state of a terminal device according to an embodiment of the present application. FIG. 2 shows steps or operations of the method for determining the state of the terminal device. However, these steps or operations are merely examples. Other operations or variations of the operations of FIG. 2 may also be performed in the embodiments of the present application. The method 200 includes:

S210, the terminal device determines an amount of data to be sent; and

S220, the terminal device determines, according to the amount of data to be sent, the state in which the terminal device needs to be.

Optionally, in a first state, the terminal device and a first access network device remain connected, the terminal device and the first access network device save context information of the terminal device, and when moving within a coverage of all access network devices in an access network device set to which the first access network device belongs, the terminal device performs a cell reselection process without switching between access network devices, in a second state, the terminal device is controlled by an access network device to which the terminal device belongs to switch between access network devices.

It should be understood that the first state and the second state in the embodiments of the present application may be the above-mentioned "inactive state" and "active state", or may be an idle state, a data connection state, and other states that may occur in a future communication system, which, however, is not limited in the embodiments of the present application.

Specifically, when the terminal device needs to send data to the first access network device, the terminal device may first determine an amount of data to be sent, and then determine, according to the amount of data to be sent, the state in which the terminal device needs to be.

Therefore, in the embodiments of the present application, the terminal device determines, according to the amount of data to be sent, the state in which the terminal device needs to be, so that the terminal device performs data transmission in a required state, thus it is possible to avoid an unnecessary switching process, save signaling overhead, and reduce power consumption of the terminal device, thereby improving system efficiency.

As an optional embodiment, the data to be sent is: data buffered by the terminal device in at least one of the following layers: a physical layer, a packet data convergence protocol PDCP layer, a radio link control RLC layer, a media access control MAC layer, and an application layer.

Specifically, the data to be sent may be part of data or all data buffered by the terminal device. It should be understood that the data buffered by the terminal device may be distributed in each layer. Layer 1 provides a transmission and reception wireless link between the base station and the MS, which may be a physical layer; and Layer 2 provides a correct transmission and reception of a signaling message, including partially repeated detection, which may be a packet data convergence protocol (Packet Data Convergence Protocol, "PDCP" for short) layer, a radio link control (Radio Link Control, "RLC" for short) layer, a media access control (Media Access Control, "MAC" for short) layer, or the like. Layer 3 provides a delivery control message, which may be an application layer or the like. This is not limited in the embodiments of the present application.

In addition, the terminal device may determine the state in which the terminal device needs to be in various manners. Optionally, the terminal device may determine, only according to the amount of data to be sent, the state in which the terminal device needs to be, or the terminal device may determine, according to the amount of data to be sent and an available uplink transmission resource, the state in which the terminal device needs to be, the embodiment of the present application is not limited thereto.

As an optional embodiment, before the terminal device determines, according to the amount of data to be sent, the state in which the terminal device needs to be, the method further includes:

the terminal device determines an uplink transmission resource available in the first state;

the terminal device determines, according to the amount of data to be sent, the state in which the terminal device needs to be, including:

the terminal device determines, according to the amount of data to be sent and the available uplink transmission resource, the state in which the terminal device needs to be.

Specifically, the terminal device may determine the amount of data to be sent and an available uplink transmission resource, and then determine, with a comprehensive consideration of the amount of data to be sent and the available uplink transmission resource, the state in which the terminal device needs to be. It should be understood that the first state may be a state in which the terminal device is currently in.

Therefore, for the terminal device in the first state, if the available uplink transmission resource is sufficient to transmit the to-be-sent data, the terminal device may continue to remain in the first state; and for the terminal device in the second state, if the uplink transmission resource available in the first state is insufficient to transmit the to-be-sent data, then the terminal device may remain in the second state, thus it is possible to avoid unnecessary state switching and save signaling overhead for the switching.

It should be understood that the terminal device may also determine, according to the amount of data to be sent and the available uplink transmission resource, the state in which the terminal device needs to be in various manners.

As an optional embodiment, the terminal device determines, according to the amount of data to be sent and the available uplink transmission resource, the state in which the terminal device needs to be, including:

the terminal device determines, according to the available uplink transmission resource, an amount of data that can be transmitted at a time; and if the amount of data that can be transmitted at a time is less than the amount of data to be sent, the terminal device determines that the terminal device needs to be in the second state.

Specifically, the terminal device may determine, according to the available uplink transmission resource, an amount of data that can be transmitted by the terminal device at a time, and then compare the amount of data that can be transmitted at a time with the amount of data to be sent. If the amount of data that can be transmitted at a time is less than the amount of data to be sent, it indicates that the available uplink transmission resource cannot carry the to-be-sent data at a time, and then the terminal device may determine that it needs to be in the second state, so that the above to-be-sent data can be sent at a time.

As an optional embodiment, the terminal device determines, according to the amount of data to be sent and the available uplink transmission resource, the state in which the terminal device needs to be, including:

the terminal device determines, according to the available uplink transmission resource, an amount of data that can be transmitted at a time;

the terminal device determines, according to the amount of data that can be transmitted at a time, a sending time and/or the number of sending times for the amount of data to be sent; and if the sending time is greater than a first threshold and/or the number of sending times is greater than a second threshold, the terminal device determines that the terminal device needs to be in the second state.

Specifically, the terminal device may determine, according to the available uplink transmission resource, an amount of data that can be transmitted at a time, then calculate, according to the amount of data that can be transmitted by the terminal device at a time and the amount of data to be sent, a sending time and/or the number of sending times to complete sending of the to-be-sent data, and compare the sending time and/or the number of sending times with a preset threshold. If the sending time is greater than a first threshold and/or the number of sending times is greater than a second threshold, the terminal device may determine that it needs to be in the second state.

In this way, the terminal device calculates a sending time and/or number of sending times for transmitting the amount of data to be sent, and determines, according to the sending time and/or number of sending times, the state in which the terminal device needs to be, therefore, it is possible to avoid the sending time being too long or the number of sending times being too many in the first state in the case that the amount of data to be sent is too large or transmission resources available are too few, thereby reducing power consumption of the terminal device and meanwhile improving user experience.

It should be understood that the terminal device may only calculate a sending time, and determine that the terminal device needs to be in the second state if the sending time is greater than a first threshold, it is, the terminal device may only calculate the number of sending times, and determine that the terminal device needs to be in the second state in the case that the number of sending times is greater than a second threshold, the terminal device may also calculate both a sending time and the number of sending times, and determine that the terminal device needs to be in the second state in the case that the sending time is greater than a first threshold and the number of sending times is greater than a second threshold, the embodiments of the present application are not limited thereto.

It should be understood that the first threshold and the second threshold may be configured by the first access network device for the terminal device in advance, or may be agreed in the protocol, the embodiments of the present application are not limited thereto.

As an optional embodiment, the method further includes:

if the sending time is less than or equal to the first threshold and/or the number of sending times is less than or equal to the second threshold, the terminal device determines that the terminal device needs to be in the first state.

It should be understood that, if the sending time and/or the number of sending times for the to-be-sent data is less than the preset threshold when the available uplink transmission resource is used to perform the sending in the first state, the terminal device may determine that it is still in the first state, that is, the terminal device determines to not perform the state switching, and the terminal device may use the available uplink transmission resource to perform the data transmission in the current state (namely, the first state).

As an optional embodiment, the terminal device determines, according to the available uplink transmission resource, the amount of data that can be transmitted at a time, including:

the terminal device determines, according to the available uplink transmission resource and at least one of maximum available transmit power, a current transmission path loss, and a highest available modulation and coding level, the amount of data that can be transmitted at a time.

As an optional embodiment, before the terminal device determines the uplink transmission resource available in the first state, the method further includes:

the terminal device sends a resource request message to the first access network device, where the resource request message is used to request the first access network device to allocate an uplink transmission resource to the terminal device; and the terminal device determines the uplink transmission resource available in the first state, including:

the terminal device determines the available uplink transmission resource according to the allocating by the first access network device.

Specifically, in the case that the first access network device does not reserve the uplink transmission resource for the terminal device, the terminal device may first send a resource request message to the first access network device, requesting the first access network device to allocate an uplink transmission resource to the terminal device, and the first access network device allocates an available uplink transmission resource to the terminal device according to the resource request message, then the terminal device may use the available uplink transmission resource to transmit data.

As an optional embodiment, the terminal device determines, according to the amount of data to be sent, the state in which the terminal device needs to be, including:

if the amount of data to be sent is greater than a third threshold, the terminal device determines that the terminal device needs to be in the second state.

Specifically, the terminal device may compare the amount of data to be sent with a preset third threshold, and determine that the terminal device needs to be in the second state if the amount of data to be sent is greater than the third threshold, thereby ensuring a completion of data transmission of the amount of data to be sent as described above.

As an optional embodiment, the terminal device determines that the terminal device needs to be in the second state, including:

if the amount of data to be sent at each moment within a first time period is continuously greater than the third threshold, the terminal device determines that the terminal device needs to be in the second state.

Specifically, the terminal device may start a timer when the amount of data to be sent exceeds the third threshold, and count the amount of data to be sent at each moment within the first time period, if the amount of data to be sent at each moment within the first time period is continuously greater than the third threshold, the terminal device determines that the amount of data to be sent is too large, and the sending in the first state may result in poor sending efficiency, and determines that the terminal device needs to be in the second state in which the data is sent again.

In this way, the terminal device counts the amount of data to be sent within a first time period, and determines, from a continuous determination of the amount of data to be sent within the first time period, the state in which the terminal device needs to be, thus it is possible to avoid a situation in which a frequent state switching occurs due to the amount of data to be sent being unstable, and to save signaling overhead.

It should be understood that the third threshold and the first time period may be configured by the first access network device for the terminal device in advance, or may be agreed in the protocol, the embodiments of the present application are not limited thereto.

As an optional embodiment, the terminal device determines, according to the amount of data to be sent, the state in which the terminal device needs to be, including:

if the amount of data to be sent is less than a fourth threshold, the terminal device determines that the terminal device needs to be in the first state.

Specifically, the terminal device may determine that the terminal device needs to be in the first state when the amount of data to be sent is less than the fourth threshold. In this way, it is possible to ensure that the terminal device is in the first state when not sending a large amount of data, thereby saving the overhead of related signaling.

Optionally, the fourth threshold may be equal to the third threshold.

As an optional embodiment, the terminal device determines that the terminal device needs to be in the first state, including:

if the amount of data to be sent at each moment within a second time period is continuously less than the fourth threshold, the terminal device determines that the terminal device needs to be in the first state.

Specifically, the terminal device may start a timer when the amount of data to be sent is less than the fourth threshold, and count the amount of data to be sent at each moment within the second time period. If the amount of data to be sent at each moment within the second time period is continuously less than the fourth threshold, the terminal device determines that the amount of data to be sent is too small, where there is no need to maintain the terminal device in the second state, and determines that the terminal device needs to be in the first state.

In this way, the terminal device counts the amount of data to be sent within a second time period, and determines, from a continuous determination of the amount of data to be sent within the first time period, the state in which the terminal device needs to be, thus it is possible to avoid a situation in which a frequent state switching occurs due to the amount of data to be sent being unstable, and to save signaling overhead.

It should be understood that the fourth threshold and the second time period may be configured by the first access network device for the terminal device in advance, or may be agreed in the protocol, the embodiments of the present application are not limited thereto.

As an optional embodiment, after the terminal device determines, according to the amount of data to be sent, the state in which the terminal device needs to be, the method further includes:

if a current state of the terminal device is different from the state in which the terminal device needs to be, the terminal device determines to perform a state switching.

Specifically, the terminal device may be currently in the first state or the second state, if the state in which the terminal device needs to be as determined by the terminal device according to the amount of data to be sent is different from the current state of the terminal device, the terminal device may determine to perform the state switching, that is, switch from the current state to the first state or the second state.

As an optional embodiment, after the terminal device determines to perform the state switching, the method further includes:

the terminal device sends a switching request message to the first access network device, where the switching request message is used to request the first access network device to perform a configuration of the state switching of the terminal device;

receiving, by the terminal device, a configuration complete message sent by the first access network device according to the switching request message, where the configuration complete message is used to indicate that the first access network device completes the configuration of the state switching; and the terminal device performs the state switching according to the configuration complete message.

Specifically, after determining to perform the state switching, the terminal device may send a switching request message to the first access network device, requesting the first access network device to perform a related configuration of the state switching, the first access network device, after completing the configuration of the state switching of the terminal device, sends a configuration complete message to the terminal device; the terminal device receives the configuration complete message sent by the first access network device, and then performs the state switching, that is, switches from the first state to the second state, or switches from the second state to the first state.

It should be understood that the configuration of the state switching of the terminal device by the first access network device may be divided into two cases. If the terminal device requests to switch from the first state to the second state, the first access network device determines context information of the terminal device, determines a high-level signaling connection established with the terminal device, and performs a configuration of related measurement information. If the terminal device requests to switch from the second state to the first state, the first access network device needs to configure the available uplink transmission resource for the terminal device in the second state, and notifies the terminal device that the first access network device reserves the high-level signaling connection, bearer, and related context information for the terminal device so that the terminal device uses the available uplink transmission resource to transmit data in the first state.

As an optional embodiment, the switching request message carries an event indicating that the amount of data to be sent is greater than the third threshold or less than the fourth threshold; or the switching request message carries an event indicating that the sending time is greater than the first threshold; or the switching request message carries an event indicating that the number of sending times is greater than the second threshold.

It should also be understood that the message exchanged between the terminal device and the first access network device may be a radio resource control (Radio Resource Control, "RRC" for short) message, an MAC message, or a physical layer message, which is not limited in the embodiments of the present application either.

Figure 3:
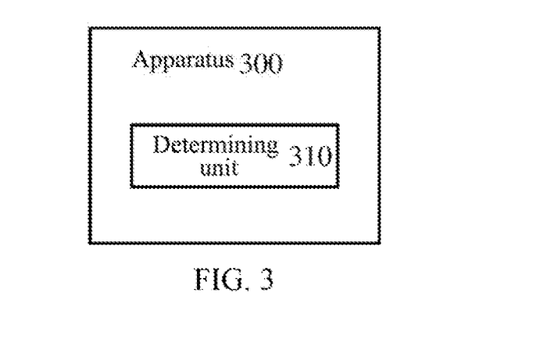
FIG. 3 is a schematic block diagram of an apparatus for determining a state of a terminal device according to an embodiment of the present application.

FIG. 3 is a schematic block diagram of an apparatus 300 for determining a state of a terminal device according to an embodiment of the present application. As shown in FIG. 3, the apparatus 300 includes:

a determining unit 310, configured to determine, for the terminal device, an amount of data to be sent;

where the determining unit 310 is further configured to: determine, according to the amount of data to be sent, a state in which the terminal device needs to be.

Optionally, in a first state, the terminal device and a first access network device remain connected, the terminal device and the first access network device save context information of the terminal device, and when moving within a coverage of all access network devices in an access network device set to which the first access network device belongs, the terminal device performs a cell reselection process without switching between access network devices; in a second state, the terminal device is controlled by an access network device to which the terminal device belongs to switch between access network devices.

Therefore, in the embodiments of the present application, the terminal device determines, according to the amount of data to be sent, a state in which the terminal device needs to be, so that the terminal device performs data transmission in a required state, thus it is possible to avoid an unnecessary switching process, save signaling overhead, and reduce power consumption of the terminal device, thereby improving system efficiency.

Optionally, the determining unit 310 is further configured to:

before determining, according to the amount of data to be sent, the state in which the terminal device needs to be, determine an uplink transmission resource available in the first state; and determine, according to the amount of data to be sent and the available uplink transmission resource, the state in which the terminal device needs to be.

Optionally, the determining unit 310 is further configured to:

determine, according to the available uplink transmission resource, an amount of data that can be transmitted at a time; and if the amount of data that can be transmitted at a time is less than the amount of data to be sent, determine that the terminal device needs to be in the second state.

Optionally, the determining unit 310 is further configured to:

determine, according to the available uplink transmission resource, an amount of data that can be transmitted at a time;

determine, according to the amount of data that can be transmitted at a time, a sending time and/or the number of sending times for the amount of data to be sent; and if the sending time is greater than a first threshold and/or the number of sending times is greater than a second threshold, determine that the terminal device needs to be in the second state.

Optionally, the determining unit 310 is further configured to:

determine, according to the available uplink transmission resource and at least one of maximum available transmit power, a current transmission path loss, and a highest available modulation and coding level, the amount of data that can be transmitted at a time.

Optionally, the terminal device further includes:

a first sending unit, configured to: before determining the uplink transmission resource available in the first state, send a resource request message to a first access network device, where the resource request message is used to request the first access network device to allocate an uplink transmission resource to the terminal device;

the determining unit 310 is further configured to:

determine the available uplink transmission resource according to the allocating by the first access network device.

Optionally, the determining unit 310 is further configured to:

if the amount of data to be sent is greater than a third threshold, determine that the terminal device needs to be in the second state.

Optionally, the determining unit 310 is further configured to:

if the amount of data to be sent at each moment within a first time period is continuously greater than the third threshold, determine that the terminal device needs to be in the second state.

Optionally, the determining unit 310 is further configured to:

if the amount of data to be sent is less than a fourth threshold, determine that the terminal device needs to be in the first state.

Optionally, the determining unit 310 is further configured to:

if the amount of data to be sent at each moment within a second time period is continuously less than the fourth threshold, determine that the terminal device needs to be in the first state.

Optionally, the determining unit 310 is further configured to:

after determining, according to the amount of data to be sent, the state in which the terminal device needs to be, if a current state of the terminal device is different from the state in which the terminal device needs to be, determine to perform a state switching.

Optionally, the terminal device further includes:

a second sending unit, configured to: after the terminal device determines to perform the state switching, send a switching request message to the first access network device, where the switching request message is used to request the first access network device to perform a configuration of the state switching of the terminal device;

a receiving unit, configured to receive a configuration complete message sent by the first access network device according to the switching request message, where the configuration complete message is used to indicate that the first access network device completes the configuration of the state switching; and a switching unit, configured to perform the state switching according to the configuration complete message.

Optionally, the data to be sent is: data buffered by the terminal device in at least one of the following layers: a physical layer, a packet data convergence protocol PDCP layer, a radio link control RLC layer, a media access control MAC layer, and an application layer.

It should be understood that the apparatus 300 herein is embodied in a form of a functional module. The term "unit" herein may refer to an application specific integrated circuit (Application Specific Integrated Circuit, ASIC), an electronic circuit, a processor for executing one or more software or firmware programs (for example, a shared processor, a specific processor, a processor group, etc.) and a memory, a merge logic circuit, and/or other suitable components supporting the described functions. In an optional example, those skilled in the art may understand that the apparatus 300 may be specifically the terminal device in the above embodiments, and the apparatus 300 may be used to perform various processes and/or steps in the above method embodiments corresponding to the terminal device. To avoid redundancy, details are not described herein.

Figure 4:
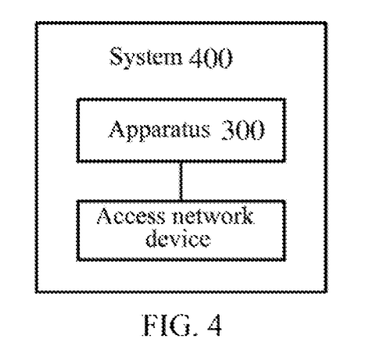
FIG. 4 is a schematic block diagram of a system for determining a state of a terminal device according to an embodiment of the present application.

FIG. 4 is a schematic block diagram of a system 400 for determining a state of a terminal device according to an embodiment of the present application. As shown in FIG. 4, the communication system 400 includes the apparatus 300 and an access network device.

The apparatus 300 is configured to perform various processes and/or steps in the above method embodiments corresponding to the terminal device. To avoid redundancy, details are not described herein. In an optional example, those skilled in the art can understand that the apparatus 300 can be specifically the terminal device in the above embodiments.

Figure 5:
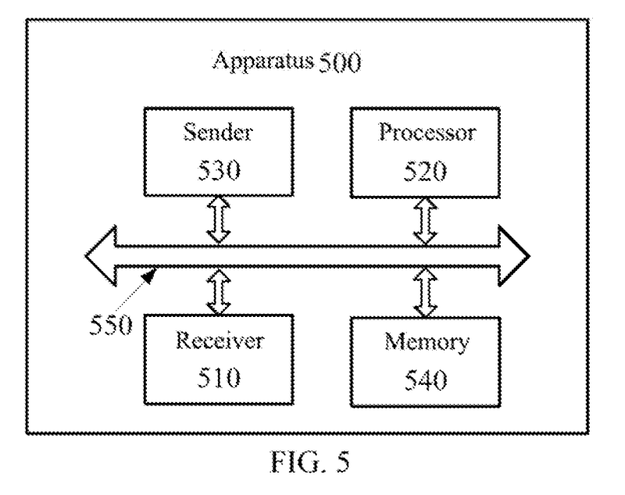
FIG. 5 is a schematic structural diagram of an apparatus for determining a state of a terminal device according to an embodiment of the present application.

FIG. 5 shows an apparatus 500 for determining a state of a terminal device according to an embodiment of the present application. The apparatus 500 includes a receiver 510, a processor 520, a sender 530, a memory 540 and a bus system 550. The receiver 510, the processor 520, the sender 530 and the memory 540 are connected via the bus system 550, where the memory 540 is configured to store instructions, the processor 520 is configured to execute the instructions stored in the memory 540 to control the receiver 510 to receive a signal and to control the sender 530 to send a signal.

The processor 520 is configured to: determine an amount of data to be sent for the terminal device; and determine, according to the amount of data to be sent, a state in which the terminal device needs to be.

Optionally, in a first state, the terminal device and a first access network device remain connected, the terminal device and the first access network device save context information of the terminal device, and when moving within a coverage of all access network devices in an access network device set to which the first access network device belongs, the terminal device performs a cell reselection process without switching between access network devices; in a second state, the terminal device is controlled by an access network device to which the terminal device belongs to switch between access network devices.

Therefore, in the embodiments of the present application, the terminal device determines, according to the amount of data to be sent, a state in which the terminal device needs to be, so that the terminal device performs data transmission in a required state, thus it is possible to avoid an unnecessary switching process, save signaling overhead, and reduce power consumption of the terminal device, thereby improving system efficiency.

Optionally, the processor 520 is further configured to:
before determining, according to the amount of data to be sent, the state in which the terminal device needs to be, determine an uplink transmission resource available in the first state; and determine, according to the amount of data to be sent and the available uplink transmission resource, the state in which the terminal device needs to be.

Optionally, the processor 520 is further configured to:
determine an amount of data that can be transmitted at a time according to the available uplink transmission resource;

if the amount of data that can be transmitted at a time is less than the amount of data to be sent, determine that the terminal device needs to be in the second state.

Optionally, the processor 520 is further configured to:
determine, according to the available uplink transmission resource, an amount of data that can be transmitted at a time;

determine, according to the amount of data that can be transmitted at a time, a sending time and/or the number of sending times for the amount of data to be sent; and if the sending time is greater than a first threshold and/or the number of sending times is greater than a second threshold, determine that the terminal device needs to be in the second state.

Optionally, the processor 520 is further configured to:
determine, according to the available uplink transmission resource and at least one of maximum available transmit power, a current transmission path loss, and a highest available modulation and coding level, the amount of data that can be transmitted at a time.

Optionally, the sender 530 is further configured to:
before determining the uplink transmission resource available in the first state, send a resource request message to a first access network device, where the resource request message is used to request the first access network device to allocate an uplink transmission resource to the terminal device;

the processor 520 is further configured to:
determine the available uplink transmission resource according to the allocating by the first access network device.

Optionally, the processor 520 is further configured to:
if the amount of data to be sent is greater than a third threshold, determine that the terminal device needs to be in the second state.

Optionally, the processor 520 is further configured to:
if the amount of data to be sent at each moment within a first time period is continuously greater than the third threshold, determine that the terminal device needs to be in the second state.

Optionally, the processor 520 is further configured to:
if the amount of data to be sent is less than a fourth threshold, determine that the terminal device needs to be in the first state.

Optionally, the processor 520 is further configured to:
if the amount of data to be sent at each moment within a second time period is continuously less than the fourth threshold, determine that the terminal device needs to be in the first state.

Optionally, the processor 520 is further configured to:
after determining, according to the amount of data to be sent, the state in which the terminal device needs to be, if a current state of the terminal device is different from the state in which the terminal device needs to be, determine to perform a state switching.

Optionally, the sender 530 is further configured to:
after the terminal device determines to perform the state switching, send a switching request message to the first access network device, where the switching request message is used to request the first access network device to perform a configuration of the state switching of the terminal device.

The receiver 510 is configured to:
receive a configuration complete message sent by the first access network device according to the switching request message, where the configuration complete message is used to indicate that the first access network device completes the configuration of the state switching.

The processor 520 is configured to: perform the state switching according to the configuration complete message.

Optionally, the data to be sent is:
data buffered by the terminal device in at least one of the following layers: a physical layer, a packet data convergence protocol PDCP layer, a radio link control RLC layer, a media access control MAC layer, and an application layer.

It should be understood that the apparatus 500 may be specifically the terminal device in the above embodiments, and may be used to perform various steps and/or processes in the above method embodiments corresponding to the terminal device. Optionally, the memory 540 may include a read-only memory and a random access memory, and provide instructions and data to the processor. A portion of the processor may also include a non-volatile random access memory. For example, the memory may also be stored with device type information. The processor 520 may be configured to execute instructions stored in the memory, and when the processor executes the instructions, the processor may perform the steps in the above method embodiments corresponding to the terminal device.

It should be understood that in the embodiments of the present application, the processor 520 may be a central processing unit (Central Processing Unit, CPU), and the processor 520 may also be other general purpose processors, digital signal processors (DSP), application specific integrated circuits (ASIC), field programmable gate arrays (FPGA) or other programmable logic devices, discrete gate or transistor logic devices, discrete hardware components, etc. The general purpose processor may be a microprocessor or the processor may be any conventional processor or the like.

It should be understood that the term "and/or" herein is merely an association relationship describing associated objects, and indicates that there may be three relationships. For example, A and/or B may indicate: presence of A only, of both A and B, and of B only. In addition, the character "/" herein generally indicates an "or" relationship between contextual objects.

It should be understood that, in various embodiments of the present application, the sequence numbers of the above processes do not imply an execution order. The execution order of the processes should be determined by their functions and internal logic, but is not intended to limit an implementation in the embodiments of the present application.

Those skilled in the art will appreciate that the elements and algorithm steps of the examples described in conjunction with the embodiments disclosed herein can be implemented in electronic hardware or a combination of computer software and electronic hardware. Whether these functions are performed in hardware or software, it depends on specific applications and design constraints of the technical solution. A person skilled in the art may use different methods to implement the described functions with respect to each particular application, but such implementation should not be considered to go beyond the scope of the present application.

Those skilled in the art can clearly understand that, for convenience and brevity of the description, reference may be made to the corresponding processes in the above method embodiments for specific operation processes of the systems, the apparatuses and the units described above, and details will not be described herein again.

In the embodiments provided in the present application, it should be understood that the disclosed systems, apparatuses, and methods may be implemented in other manners. For example, the apparatus embodiments described above are merely illustrative. For example, the division of the units is only a logical function division. In an actual implementation, there may be another division manner. For example, multiple units or components may be combined or may be integrated into another system, or some features may be ignored or not executed. In addition, a coupling or direct coupling or communication connection shown or discussed may be an indirect coupling or communication connection through some interfaces, apparatuses or units, and may be electrical, mechanical or otherwise.

The units described as separate components may or may not be physically separated, and the components shown as units may or may not be physical units, that is, may be located in one place, or may be distributed to multiple network units. Some or all of the units may be selected according to actual needs to achieve the purpose of the solution of the embodiments.

In addition, the functional units in the embodiments of the present application may be integrated into one processing unit, or each of the units may exist alone physically, or two or more units may be integrated in one unit.

The functions may be stored in a computer readable storage medium if implemented in the form of a software functional unit and sold or used as a standalone product. Based on such understanding, the essence of the technical solution of the present application, or a part of the technical solution of the present application contributing to the prior art, or a part of the technical solution may be embodied in the form of a software product which is stored in a storage medium, including instructions for enabling a computer device (which may be a personal computer, a server, or the first access network device, etc.) to perform all or part of the steps of the methods described in the embodiments of the present application. The above storage medium includes: various mediums capable of storing program codes, such as a USB flash disk, a mobile hard disk, a read-only memory (ROM, Read-Only Memory), a random access memory (RAM, Random Access Memory), a magnetic disk, an optical disk, or the like.

The above description is only specific embodiments of the present application, but the protection scope of the present application is not limited thereto. Any modification or substitution conceived by persons skilled in the art within the technical scope of the present application should be covered in the protection scope of the present application. Therefore, the protection scope of the present application is subject to the protection scope of the appended claims.

What is claimed is:

1. A method for determining a state of a terminal device, comprising:
  determining, by the terminal device, an amount of data to be sent; and
  determining, by the terminal device, according to the amount of data to be sent, a state in which the terminal device needs to be;
  wherein in a first state, the terminal device saves context information of the terminal device, and when moving within a coverage of all access network devices in an access network device set to which a first access network device belongs, the terminal device performs a cell reselection process without switching between access network devices; in a second state, the terminal device is controlled by an access network device to which the terminal device belongs to switch between access network devices;
  wherein after the determining, by the terminal device, according to the amount of data to be sent, the state in which the terminal device needs to be, the method further comprises:
  if a current state of the terminal device is different from the state in which the terminal device needs to be, determining, by the terminal device, to perform a state switching;

wherein after the determining, by the terminal device, to perform the state switching, the method further comprises:

sending, by the terminal device, a switching request message to the first access network device, wherein the switching request message is used to request the first access network device to perform a configuration of the state switching of the terminal device;

receiving, by the terminal device, a configuration complete message sent by the first access network device according to the switching request message, wherein the configuration complete message is used to indicate that the first access network device has completed the configuration of the state switching; and performing, by the terminal device, the state switching according to the configuration complete message.

2. The method according to claim 1, wherein before the determining, by the terminal device, according to the amount of data to be sent, the state in which the terminal device needs to be, the method further comprises:

determining, by the terminal device, an uplink transmission resource available in the first state;

the determining, by the terminal device, according to the amount of data to be sent, the state in which the terminal device needs to be comprises:

determining, by the terminal device, according to the amount of data to be sent and the available uplink transmission resource, the state in which the terminal device needs to be.

3. The method according to claim 2, wherein the determining, by the terminal device, according to the amount of data to be sent and the uplink transmission resource available, the state in which the terminal device needs to be comprises:

determining, by the terminal device, according to the available uplink transmission resource, an amount of data that can be transmitted at a time; and if the amount of data that can be transmitted at a time is less than the amount of data to be sent, determining, by the terminal device, that the terminal device needs to be in the second state.

4. The method according to claim 3, wherein the determining, by the terminal device, according to the available uplink transmission resource, the amount of data that can be transmitted at a time comprises:

determining, by the terminal device, according to the available uplink transmission resource and at least one of maximum available transmit power, a current transmission path loss, or a highest available modulation and coding level, the amount of data that can be transmitted at a time.

5. The method according to claim 1, wherein the data to be sent is:

data buffered by the terminal device in at least one of the following layers: a physical layer, a packet data convergence protocol PDCP layer, a radio link control RLC layer, a media access control MAC layer, and an application layer.

6. The method according to claim 1, wherein the first state is an idle state and the second state is a connection state.

7. An apparatus for determining a state of a terminal device, comprising:

a memory, a processor, and a computer program stored on the memory and operable on the processor, wherein the processor, when running the computer program, is configured to:

determine, for the terminal device, an amount of data to be sent;

wherein the processor is further configured to: determine, according to the amount of data to be sent, a state in which the terminal device needs to be;

wherein in a first state, the terminal device saves context information of the terminal device, and when moving within a coverage of all access network devices in an access network device set to which a first access network device belongs, the terminal device performs a cell reselection process without switching between access network devices; in a second state, the terminal device is controlled by an access network device to which the terminal device belongs to switch between access network devices;

wherein the processor is further configured to:

after determining, according to the amount of data to be sent, the state in which the terminal device needs to be, if a current state of the terminal device is different from the state in which the terminal device needs to be, determine to perform a state switching;

after the terminal device determines to perform the state switching, send a switching request message to the first access network device, wherein the switching request message is used to request the first access network device to perform a configuration of the state switching of the terminal device;

receive a configuration complete message sent by the first access network device according to the switching request message, wherein the configuration complete message is used to indicate that the first access network device has completed the configuration of the state switching; and perform the state switching according to the configuration complete message.

8. The apparatus according to claim 7, wherein the processor is further configured to:

before determining, according to the amount of data to be sent, the state in which the terminal device needs to be, determine an uplink transmission resource available in the first state; and determine, according to the amount of data to be sent and the available uplink transmission resource, the state in which the terminal device needs to be.

9. The apparatus according to claim 8, wherein the processor is further configured to:

determine, according to the available uplink transmission resource, an amount of data that can be transmitted at a time; and if the amount of data that can be transmitted at a time is less than the amount of data to be sent, determine that the terminal device needs to be in the second state.

10. The apparatus according to claim 9, wherein the processor is further configured to:

determine, according to the available uplink transmission resource and at least one of maximum available transmit power, a current transmission path loss, or a highest available modulation and coding level, the amount of data that can be transmitted at a time.

11. The apparatus according to claim 7, wherein the data to be sent is:

data buffered by the terminal device in at least one of the following layers: a physical layer, a packet data convergence protocol PDCP layer, a radio link control RLC layer, a media access control MAC layer, and an application layer.

12. The apparatus according to claim 7, wherein the first state is an idle state and the second state is a connection state.

\* \* \* \* \*